United States Patent [19]

Wu

[11] Patent Number: 6,003,956
[45] Date of Patent: Dec. 21, 1999

[54] WHEEL MOUNTING ARRANGEMENT FOR A GOLF CART

[76] Inventor: David Wu, No. 35-1, Jih Hsin Street, Tu Cheng Hsiang, Taipei Hsien, Taiwan

[21] Appl. No.: 09/063,365

[22] Filed: Apr. 21, 1998

[51] Int. Cl.⁶ .................................................. B60B 37/00
[52] U.S. Cl. .......................... 301/120; 301/111; 301/122
[58] Field of Search .................................. 301/111, 112, 301/118, 119, 120, 121, 122, 125

[56] References Cited

U.S. PATENT DOCUMENTS

| | | | |
|---|---|---|---|
| 1,188,337 | 6/1916 | Siebert et al. | 301/122 X |
| 1,354,114 | 9/1920 | Lindberg | 301/120 |
| 1,540,508 | 6/1925 | White | 301/122 X |
| 5,507,566 | 4/1996 | Chen | 301/111 |

FOREIGN PATENT DOCUMENTS

| | | | |
|---|---|---|---|
| 405109 | 1/1967 | Australia | 301/121 |
| 708094 | 4/1965 | Canada | 301/121 |

*Primary Examiner*—Russell D. Stormer
*Attorney, Agent, or Firm*—Varndell & Varndell, PLLC

[57] ABSTRACT

A wheel mounting arrangement includes a holder plate connected to the frame of a golf cart, a wheel axle holding a wheel and having a rectangular coupling block at one end fitted into a rectangular coupling block of the wheel axle has a locating groove; a press knob is slidably mounted in a transverse hole on the holder plate and supported on a spring, the press knob having a springy hook hooked in the locating groove on the rectangular coupling block of the wheel axle to stop it from axial movement, the springy hook being disengaged from the locating groove when the press knob is depressed, enabling the wheel axle to disconnected from the holder plate.

1 Claim, 6 Drawing Sheets

WHEEL MOUNTING ARRANGEMENT FOR A GOLF CART

BACKGROUND SUMMARY OF THE INVENTION

The present invention relates to a wheel mounting arrangement, and more particularly to such a wheel mounting arrangement which enables the wheel axle to be quickly installed simply by operating a press knob.

U.S. Pat. No. 5,171,068, which is issued to the present inventor, discloses a golf cart wheel axle assembly having a holder plate connected to the frame of a golf cart to hold a wheel axle by a lock screw. When the wheel axle is installed, the lock screw must be screwed through a tapered hole on the wheel axle into a bolt hole on a tapered rod at the wheel axle. It takes much time to fasten or unfasten the lock screw. U.S. Pat. No. 5,658,054, which is another invention of the present inventor, indicates a wheel mounting structure including a wheel shaft fastened to a locating hole on the leg of a golf club carrier to hold a wheel, and lever pivoted to the leg and turned to lock the wheel shaft. The lever has a stop rod section and a retainer rod section which are respectively forced into engagement with a recessed bottom hole on a locating block at the wheel shaft and a bottom retaining groove on a collar at the wheel shaft when the lever is turned to the locking position to lock the wheel shaft on the leg of the golf club carrier. The main drawback of this wheel mounting structure is that the positioning parts wear quickly with use, causing a high noise to be produced.

It is one object of the present invention to provide a wheel mounting arrangement which can be conveniently assembled or dismounted simply by means of pressing down a press knob. It is still another object of the present invention to provide a wheel mounting arrangement which allows the golf cart user to mount/dismount the wheel by oneself without any special training.

According to the invention, a holder plate is connected to the frame of a golf cart to hold the rectangular coupling block of a wheel axle in a rectangular coupling hole thereon, and a press knob is slidably mounted in a hole on a holder plate and supported on a spring to lock the wheel axle on the holder plate. The press knob is disengaged from the rectangular coupling block of the wheel axle when it is depressed to compress the spring, enabling the wheel axle to be disconnected from the holder plate.

DETAILED DESCRIPTION OF THE PREFERRED EMBODIMENT

Figure 1:
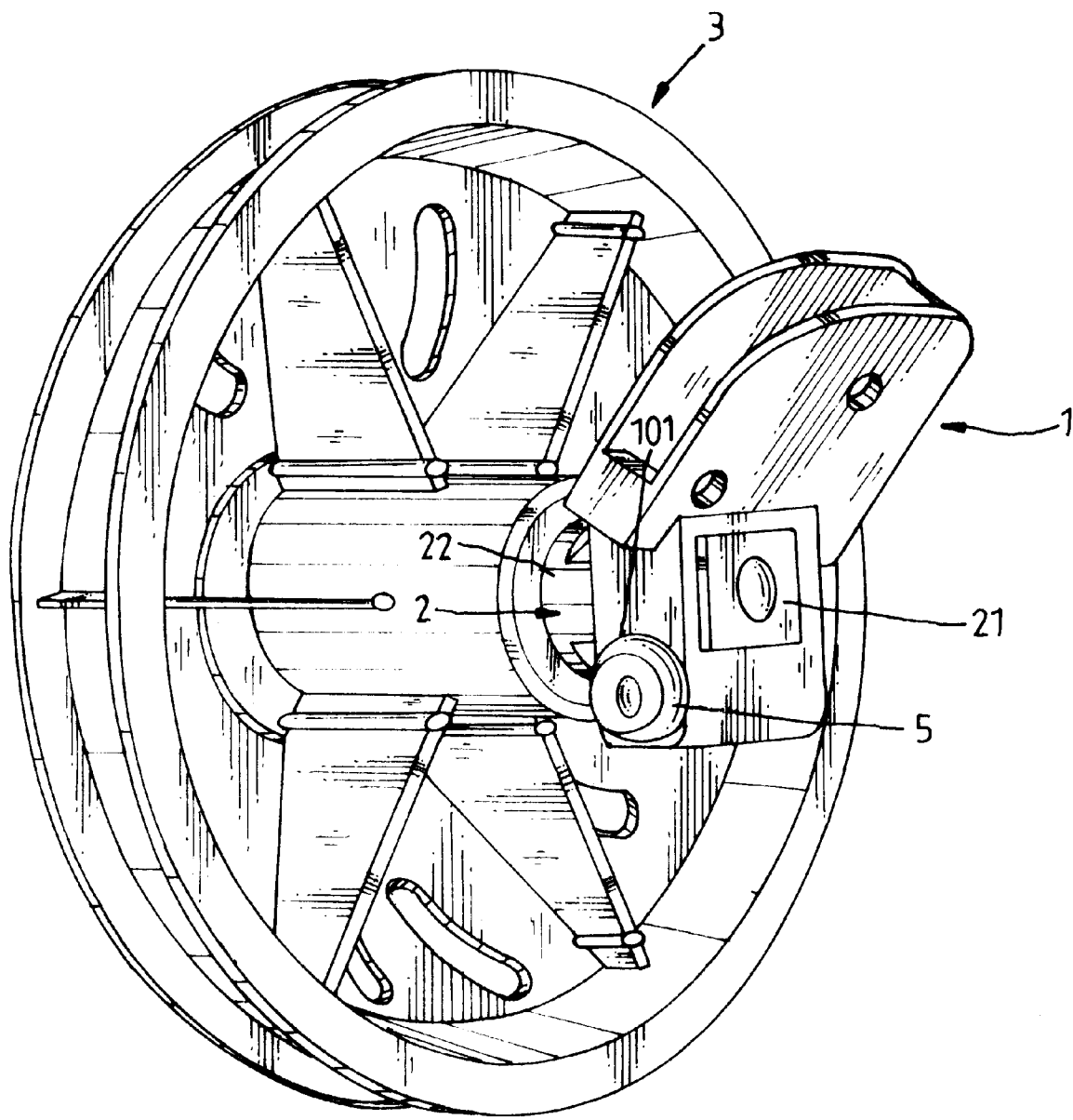
FIG. 1 is perspective view of a wheel mounting arrangement for a golf cart according to the present invention.
Figure 2:
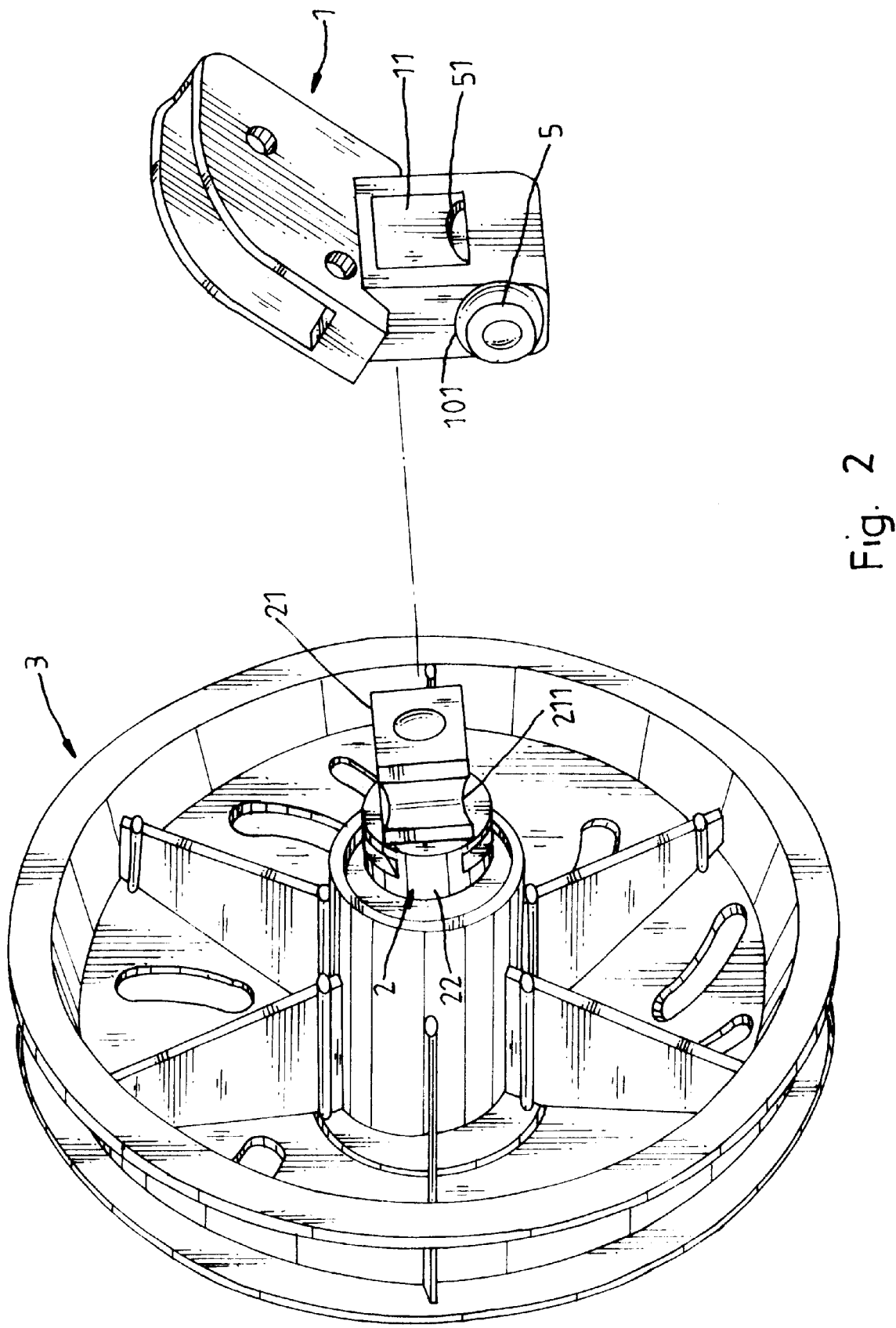
FIG. 2 is an exploded view of the wheel mounting arrangement shown in FIG. 1.

Referring to FIGS. 1 and 2, a wheel mounting arrangement for a golf cart in accordance with the present invention is generally comprised of a holder plate 1 connected to the frame of a golf cart, and a wheel axle 2 fastened to the holder plate 1 to hold a wheel 3. The holder plate 1 comprises a rectangular coupling hole 11 for holding the wheel axle 2. The wheel axle 2 comprises an axle body 22 fastened to the wheel 3, and a rectangular coupling block 21 longitudinally extended from one end of the axle body 22 and fitted into the rectangular mounting hole 11 of the holder plate 1.

Figure 3:
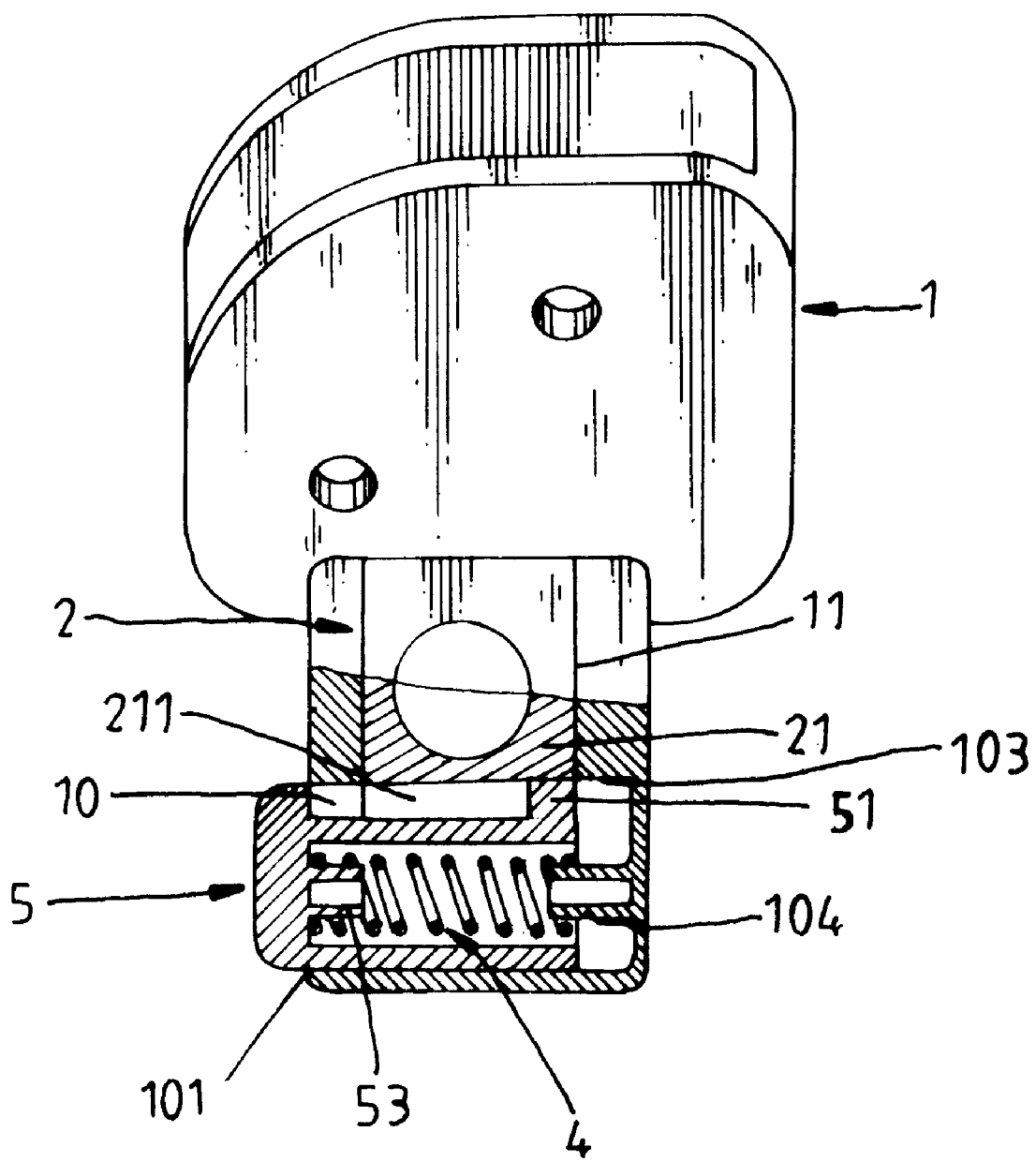
FIG. 3 is a sectional view of a part of the present invention, showing the springy hook of the press knob hooked in the locating groove on the rectangular coupling block of the wheel axle.
Figure 5:
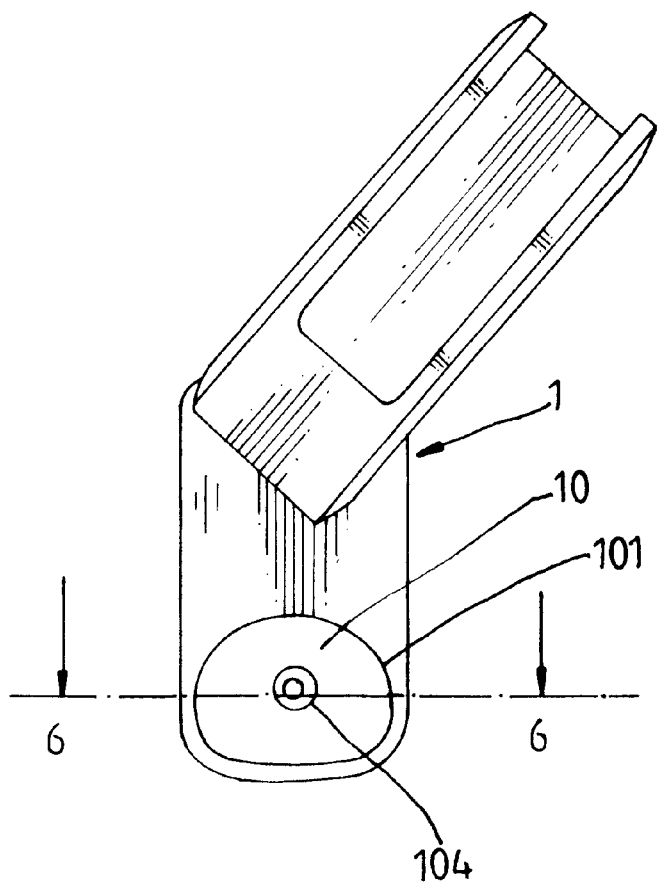
FIG. 5 is a side plain view of the holder plate according to the present invention.
Figure 6:
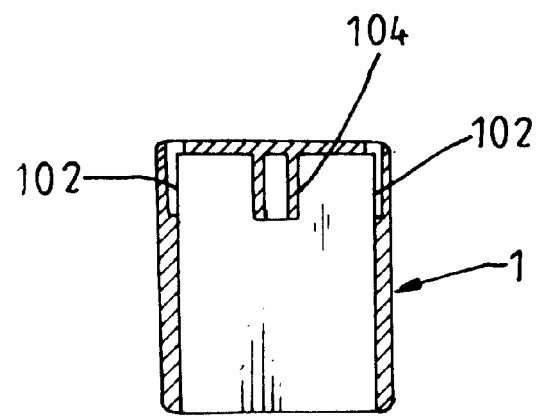
FIG. 6 is a sectional view taken along line 6—6 of FIG. 5.

Referring to FIGS. 3, 5 and 6, the holder plate I further comprises a transverse hole 10 in communication with the rectangular coupling hole 11 at the bottom, two horizontal sliding grooves 102 bilaterally disposed inside the transverse hole 10, and a rod 104 longitudinally disposed at the end of the transverse hole 10. The transverse hole 10 has an orifice 101 at one side wall of the holder plate 1.

Figure 8:
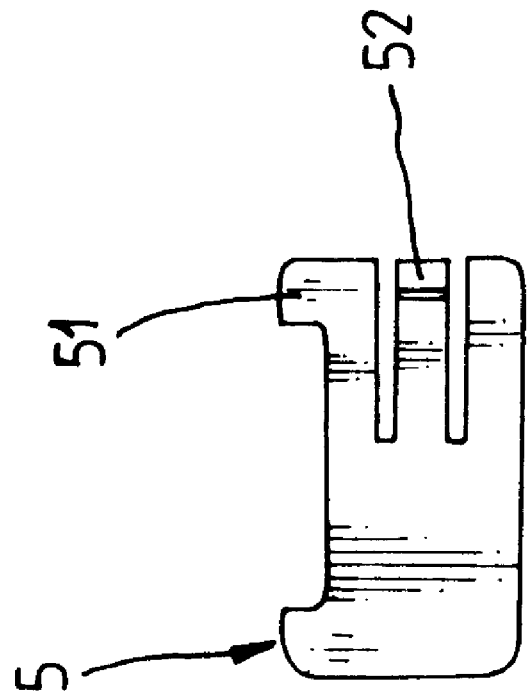
FIG. 8 is a side plain view of the press knob according to the present invention.
Figure 7:
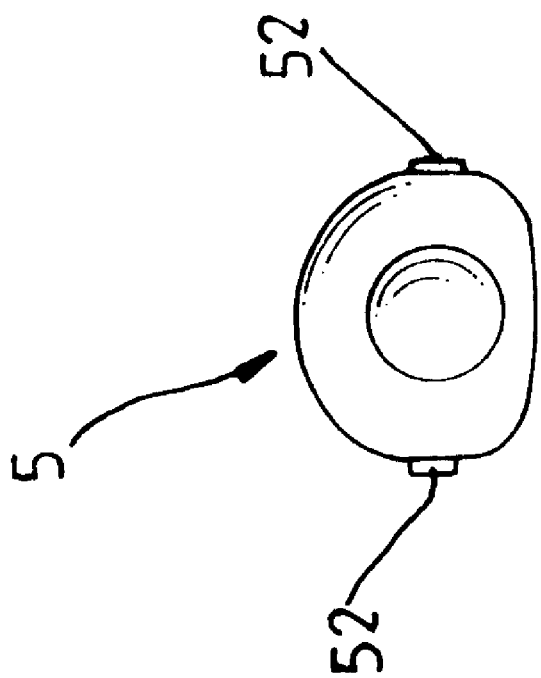
FIG. 7 is a front view of the press knob according to the present invention.

Referring to FIGS. 7 and 8, and FIGS. 1, 2, 3 and 6 again, a press knob 5 is inserted through the transverse hole 10. The press knob 5 is a hollow member comprising two protruded portions 52 bilaterally raised from the outside wall thereof and respectively engaged into the horizontal sliding grooves 102 inside the transverse hole 10, and inside rod 53, and a springy hook 51 integral with the top side wall of the front end thereof for engagement with a locating groove 211 on the rectangular coupling block 21 of the wheel axle 2 (see FIG. 3). A compression spring 4 is mounted inside the transverse hole 10 of the holder plate 1, and connected between the rod 104 and the inside rod 53 of the press knob 5. A recessed portion 103 is provided at the top side wall of the transverse hole 10 at an inner end (see FIG. 3).

Figure 4:
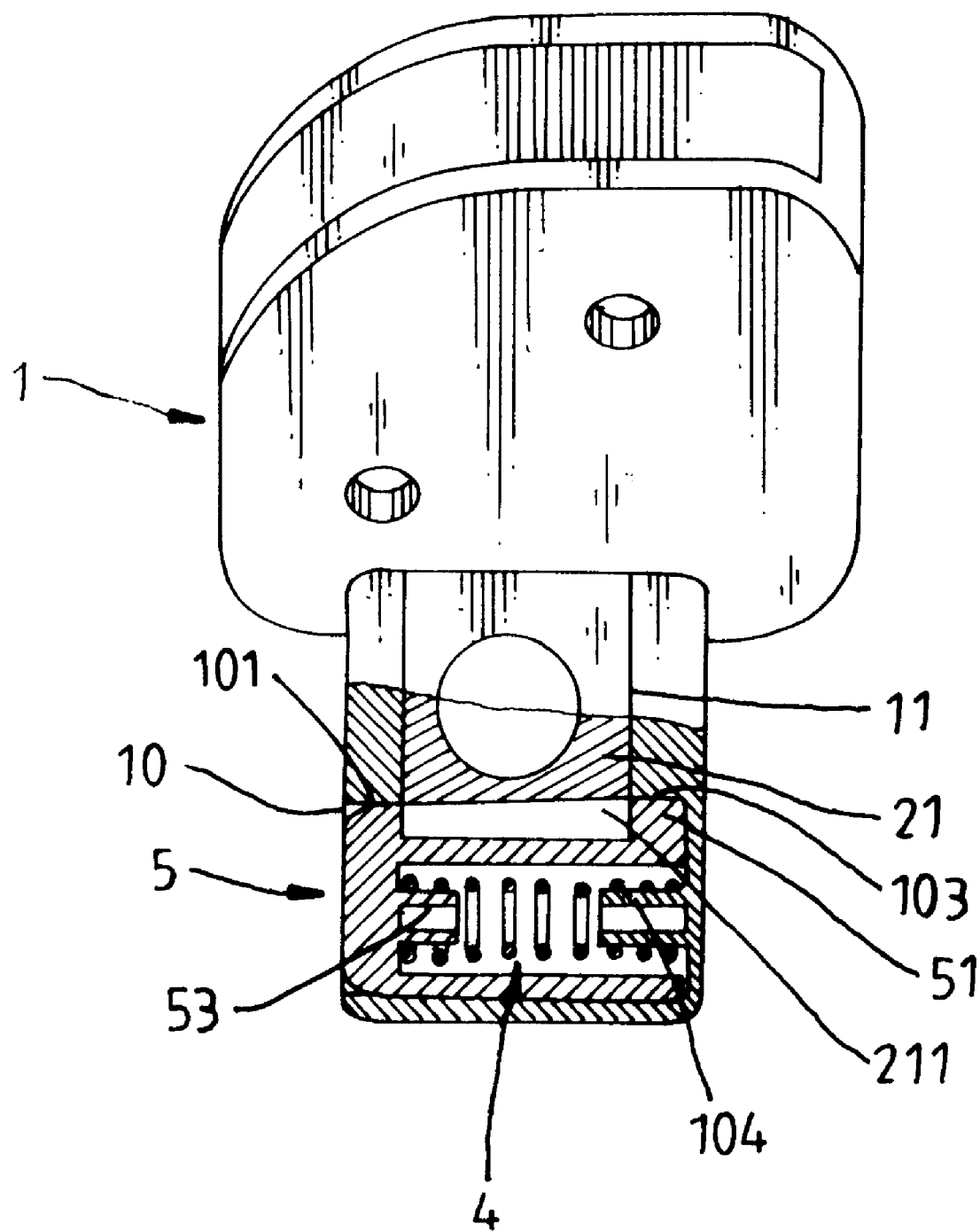
FIG. 4 is similar to FIG. 3 but showing the press knob depressed, the springy hook disengaged from the rectangular coupling block of the wheel axle.

Referring to FIG. 4 and FIG. 3 again, when the press knob 5 is depressed to compress the compression spring 4, the springy hook 51 is moved with the press knob 5 into recessed portion 103 (see FIG. 4), enabling the rectangular coupling block 21 of the wheel axle 2 to be inserted into the rectangular coupling hole 11. After the rectangular coupling block 21 of the wheel axle 2 has been inserted into the rectangular coupling hole 11 of the holder plate 1, the press knob 5 is released from the hand, enabling the press knob 5 to be pushed back to its former position. When the press knob 5 is pushed back to its former position as shown in FIG. 3, the springy hook 51 is engaged into the locating groove 211 on the rectangular coupling block 21 of the wheel axle 2, and therefore the wheel axle 2 is stopped from axial movement. When the press knob 5 is pressed down again, the springy hook 51 is moved with the press knob 5 into the recessed portion 103 inside the transverse hole 10 and disengaged from the locating groove 211 of the rectangular coupling block 21 of the wheel axle 2 (see FIG. 4), enabling the wheel axle 2 to be disconnected from the holder plate 1.

I claim:

1. A wheel mounting arrangement comprising a holder plate connected to the frame of a golf cart, said holder plate having a rectangular coupling hole, and a wheel axle fastened to said holder plate to hold a wheel, said wheel axle having a rectangular coupling block at one end fitted into the rectangular coupling hole on said holder plate, wherein:

said holder plate comprises a transverse hole intersecting said rectangular coupling hole at a bottom side, two longitudinal sliding grooves bilateraly disposed inside said transverse hole, an inside rod longitudinally disposed at an inner end of said transverse hole;

said rectangular block of said wheel axle has a locating groove;

a hollow press knob slidably mounted in said transverse hole on said holder plate, said press knob comprising two protruded portions at opposite sides respectively engaged into the longitudinal sliding grooves inside said transverse hole on said holder plate, an inside rod, spring means having one end connected to the inside rod of said hollow press knob and an opposite end connected to the inside rod of said holder plate, said spring means imparting an outward pressure to said hollow press knob, and a springy hook raised from a top side and an inner end thereof and engaged into the locating groove on said rectangular coupling block of said wheel axle to stop said wheel axle from axial movement in said rectangular coupling hole of said holder plate, said springy hook being disengaged from the locating groove on said rectangular coupling block of said wheel axle when said hollow press knob is depressed, enabling said wheel axle to be disconnected from said holder plate.

* * * * *